United States Patent [19]
Nakata

[11] Patent Number: 5,509,036
[45] Date of Patent: Apr. 16, 1996

[54] SYNCHRONIZING SIGNAL DETECTION APPARATUS

[75] Inventor: Hiroshi Nakata, Hyogo, Japan

[73] Assignee: Mitsubishi Denki Kabushiki Kaisha, Tokyo, Japan

[21] Appl. No.: 420,679

[22] Filed: Apr. 12, 1995

[30] Foreign Application Priority Data

May 23, 1994 [JP] Japan .................................. 6-108435

[51] Int. Cl.⁶ ...................................................... H04L 7/00
[52] U.S. Cl. ...................... 375/368; 375/365; 370/105.4
[58] Field of Search ..................... 375/365, 366, 375/367, 368; 370/105.4, 106; 455/343

[56] References Cited

U.S. PATENT DOCUMENTS 5,241,568  8/1993  Fernandez et al. ...................... 375/368

FOREIGN PATENT DOCUMENTS 2246436  10/1990  Japan .

*Primary Examiner*—Stephen Chin
*Assistant Examiner*—Kevin Kim
*Attorney, Agent, or Firm*—Rothwell, Figg, Ernst & Kurz

[57] ABSTRACT

A synchronizing signal detection apparatus of the present invention comprises a demodulator for digitally demodulating input signals, a partial matching error counter for comparing every bit of the demodulated input signal bit pattern demodulated by said demodulator with a part of the known synchronizing signal bit pattern. The apparatus further comprises a remaining bit matching counter for comparing the input signal bit pattern with remaining bits of the synchronizing signal bit pattern used in the partial matching error counter, or with all synchronizing signal bit pattern, for every bit, when an error bit number, which is compared in the partial matching error counter, is equal or less than a first threshold value. When the error bit number compared in the remaining bits matching error counter is equal or less than a second threshold value, synchronizing signal is assumed to be detected. In the apparatus of the present invention, bit pattern comparison numbers are decreased.

6 Claims, 9 Drawing Sheets

SYNCHRONIZING SIGNAL DETECTION APPARATUS

BACKGROUND OF THE INVENTION

1. Field of the Invention

The invention relates to an apparatus for detecting synchronizing signal for establishing synchronization in the field of mobile communication, especially for reducing the processing needed to detect the synchronizing signal using a Digital Signal Processor.

2. Description of the Prior Art

FIG. 9 is block diagram of a construction of the conventional apparatus for detecting synchronizing signal. In FIG. 9, the numeral 1 denotes an antenna, the numeral 2 denotes a frequency converter from RF (radio frequency) band to BB (base band), the numeral 3 denotes a filter, the numeral 4 denotes an AD converter, the numeral 5 denotes a π/4 shift QPSK demodulator, the numeral 6 denotes an error counter using all synchronizing signal bit patterns, and the numeral 7 denotes a threshold discriminator.

An operation of the conventional synchronizing signal detection apparatus shown in FIG. 9 is explained below. It is assumed that the length of a signal bit pattern in one frame is 1000 bits, wherein the length of the synchronizing signal bit pattern is 30 bits, as an example. An input analog signal inputted from an antenna is converted into a digital signal in the analog/digital converter 4 and demodulated into a digital demodulation bit pattern in the π/4 shift QPSK demodulator and is inputted to the error counter 6. The error counter 6 memorizes 30 bits of the synchronizing signal bit pattern and compares all bits of the input signal bit pattern and 30 bits of the synchronizing signal bit patterns. Therefore, in the prior art, it is necessary to compare the input signal bit pattern with all synchronizing signal bit patterns for 30×1000 times, that is, 30,000 times.

There is another conventional apparatus which processes the entire comparison in a special hardware for detecting a synchronizing signal. In other words, the conventional apparatus includes a synchronizing signal detecting circuit for comparing always the input signal bit pattern with 30 bits of the synchronizing signal bit pattern, and for shifting the input signal bit pattern one after another and for detecting a synchronizing signal when all 30 bits patterns are matched with the synchronizing signal.

Since the conventional synchronizing signal detection apparatuses are constructed as described above, the amount of processing increases in the conventional apparatuses which compares all synchronizing signal bit patterns. Therefore, a special hardware or a high speed signal processor is required. Since these apparatuses consume a large amount of electric power, they are inappropriate for the mobile telephone.

SUMMARY OF THE INVENTION

It is an object of the present invention to provide a synchronizing signal detection apparatus which detects a synchronizing signal easily by using a digital signal processor (DSP) having low processing ability and reduces the amount of processing.

It is another object of the present invention to provide a synchronizing signal detection apparatus for improving detection efficiency by using comparison bit numbers being 10 to 25% of the synchronizing signal.

It is another object of the present invention to provide a synchronizing signal detection apparatus for decreasing detection time and amount of processing by separating the correlation calculation of a part of synchronizing waveform data from that of a remaining synchronizing waveform data, and without demodulating the bit patterns.

It is further another object of the present invention to provide a synchronizing signal detection apparatus for obtaining a small error detection probability, by separating the correlation calculation of a part of synchronizing waveform data from that of a remaining synchronizing waveform data, and by calculating bit patterns matching after demodulation is carried out.

It is further another object of the present invention to provide a synchronizing signal detection apparatus for improving detection efficiency by using correlation bit numbers being 10 to 25% of the synchronizing signal.

According to one aspect of the present invention, there is provided a synchronizing signal detection apparatus comprising: a demodulator for digitally demodulating input signals; a partial matching error counter for comparing every bit of the demodulated input signal bit pattern demodulated by the demodulator with a part of the known synchronizing signal bit pattern; and a remaining bit matching counter for comparing the input signal bit pattern with remaining bits of the synchronizing signal bit pattern used in the partial matching error counter, or with all synchronizing signal bit pattern, for every bit, when an error bit number, which is compared in the partial matching error counter, is equal or less than a first threshold value, According to another aspect of the present invention, there is provided a synchronizing signal detection apparatus wherein the partial matching error counter compares the input signal bit pattern with 10 to 25% of the synchronizing signal bit pattern.

According to another aspect of the present invention, there is provided a means for generating and storing a corresponding complex synchronizing signal waveform data from known synchronizing signal bit pattern; a partial correlator for correlation calculating between the sampled input signal data and a part of waveform data which is an output data of the synchronizing signal waveform generation and store means; and a remaining correlator for complex correlation calculating between the input signal waveform data and remaining synchronizing signal waveform data which is other data stored in the synchronizing signal waveform generation and store means, or all synchronizing signal waveform data, when a correlation result calculated by the partial correlator exceeds a first predetermined threshold value, when the correlation result calculated in the remaining correlator is equal or larger than a second predetermined threshold value, synchronizing signal is assumed to be detected.

According to another aspect of the present invention, there is provided a means for generating a corresponding complex synchronizing signal waveform data from known synchronizing signal bit patterns and for storing the generated corresponding complex synchronizing signal waveform data; a partial correlator for correlation calculating between the sampled input signal data and a part of waveform data which is an output data of the synchronizing signal waveform generation and store means; a time location store means for storing a predetermined number of the time locations of an input signal waveform data which corresponds to a large correlation value calculated in the partial correlator; a remaining correlator for complex correlation calculating between the input signal waveform data which is stored in the time location store means and remaining synchronizing signal waveform data which is other data stored in the synchronizing signal waveform generation and store means, or all synchronizing signal waveform data; a demodulator for demodulating a predetermined bit length of an input signal waveform data which corresponds to a large correlation value calculated in the remaining correlator; and a counter means for comparing a bit pattern demodulated in the modulator with the known synchronizing signal bit pattern for every bit, when the correlation result calculated in the remaining correlator is less than a second predetermined threshold value, synchronizing signal is assumed to be detected.

According to another aspect of the present invention, there is provided a synchronizing signal detection apparatus; the partial correlator calculates complex correlation between the input signal waveform data and 10 to 25% of the waveform generated by the synchronizing signal waveform generation and store mean.

DETAILED DESCRIPTION OF THE PREFERRED EMBODIMENTS

EMBODIMENT 1

Figure 1:
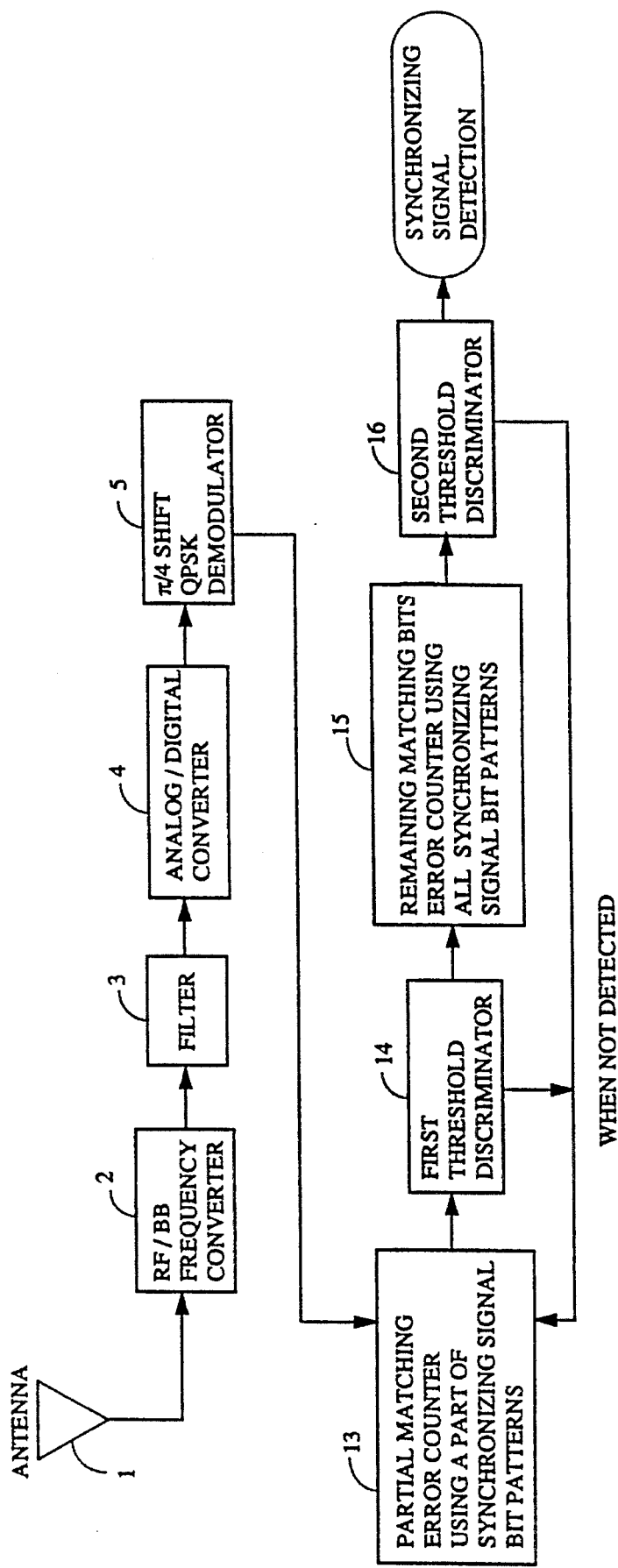
FIG. 1 is a block diagram of a synchronizing signal detection apparatus of a first embodiment of the present invention.

FIG. 1 is a block diagram of a synchronizing signal detection apparatus of a first embodiment of the present invention. In the first embodiment, the matching process between the input signal bit patterns and the synchronizing signal bit pattern is divided into two portions, one of which is a partial matching process with a synchronizing signal bit pattern and the other is a remaining matching process with the remaining synchronizing signal bit pattern.

Figure 9:
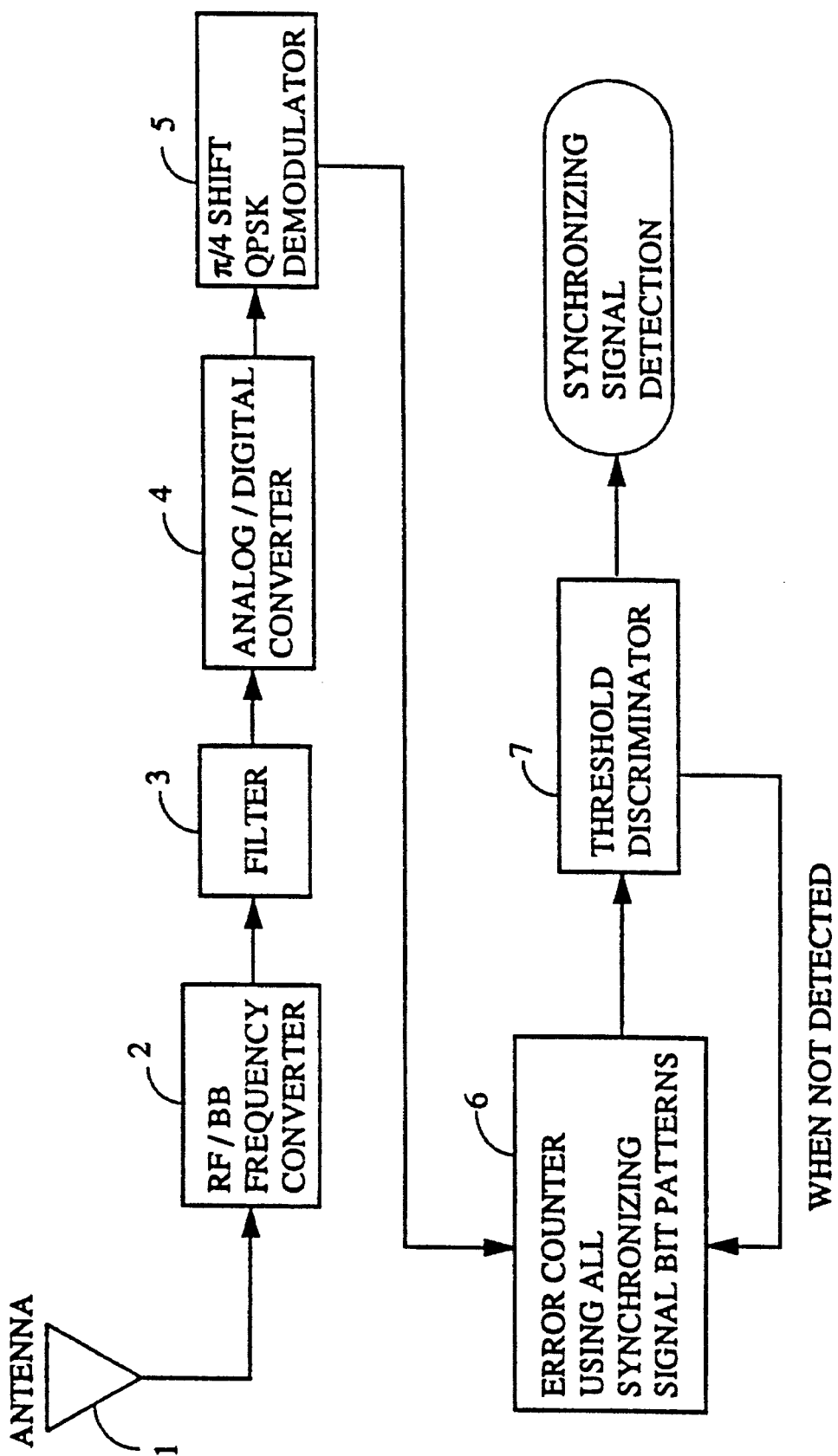
FIG. 9 is a block diagram of a conventional synchronizing signal detection apparatus.

In FIG. 1, the numeral 13 denotes a partial matching error counter for matching the input signal with the partial synchronizing signal bit patterns, the numeral 14 denotes a first threshold discriminator, the numeral 15 denotes a remaining bits matching error counter 15 using all remaining synchronizing signal bit patterns and the numeral 16 denotes a second threshold discriminator. The frequency converter 2, filter 3, analog-to-digital converter 4 and π/4 shift QPSK demodulator 5 are the same as those in FIG. 9.

Figure 3:
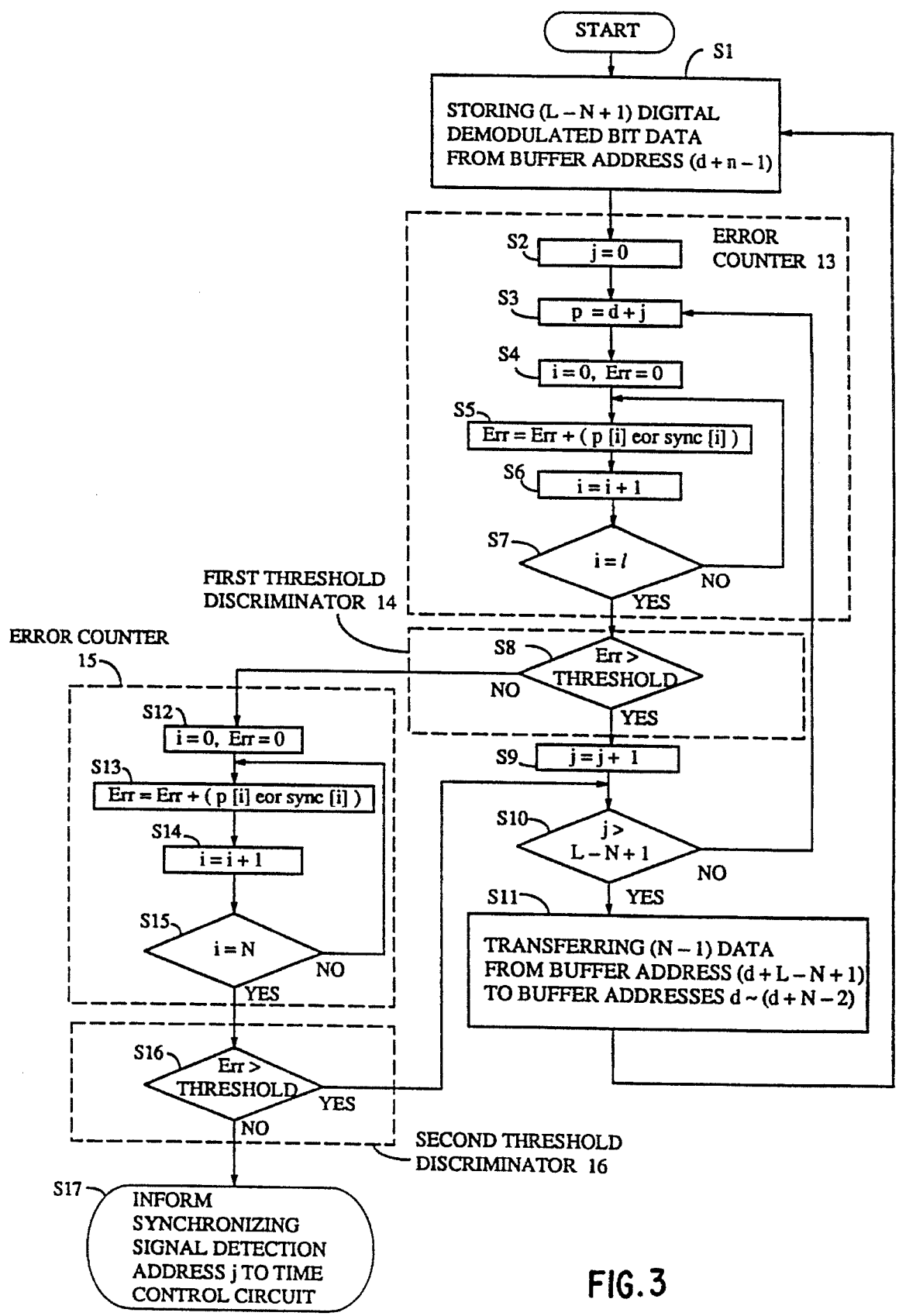
FIG. 3 is an operation flow chart of an apparatus of a first embodiment of the present invention.

FIG. 3 is an operation flow chart of an apparatus of a first embodiment of the present invention in FIG. 1. In FIG. 3, "d" is an address of the input signal bit pattern buffer, "sync" is an address of the synchronizing signal bit pattern buffer, "p" is a pointer which points the input signal bit pattern buffer d. "l" is a synchronizing signal bit pattern length used in the partial error counter 13, "N" is a synchronizing signal bit pattern length, "L" is a buffer length of the input signal bit pattern buffer d, "eor" is an operator showing exclusive OR, "i" and "j" are count numbers of loop counters, "Err" is a number of error bits, "THRESHOLD" is a threshold of the error bit numbers which detects error when Err is below this THRESHOLD value.

An operation of the first embodiment is explained below. The radio frequency input signal received at the radio antenna 1 is converted to a predetermined frequency band signal by RF/BB frequency converter 2. The undesired signals are filtered by the filter 3. The converted base band frequency are converted to a digital signal by the analog-to-digital converter 4, then demodulated into a waveform of a digital bit pattern by π/4 shift QPSK demodulator 5.

In step S1 of FIG. 3, the digital signal processor (DSP) stores the demodulated digital bit patterns into a predetermined buffer. The partial matching error counter 13 memorizes, for example, l bits which have a partial matching with N bits synchronizing signals which serve as reference. In step S3, the pointer p points a top location d of the input signal bit pattern buffer d, such as p=d. First, in step S4, the error bit count Err and the loop count i are initialized to zero. In step S5, every bit is counted such as Err=Err+(p[i] eor sync [i]) until l bits is compared. When all bits are compared in step S7, Err is compared with THRESHOLD in step S8.

The first threshold discriminator 14 decides bit numbers as to how many bits numbers are necessary to match with for carrying out the comparing process in the remaining bit matching error counter 15. For example, in step S8, the error bit number Err is compared with THRESHOLD whether Err is above the threshold variables THRESHOLD. When Err exceeds THRESHOLD in step S8, the pointer p is incremented in step S9 by one such as j=j+1, which pointer p indicates the input signal bit pattern buffer d address. In step S10, j is compared with the length (L−N+1). When j is within the limit of (L−N+1), the error count begins to count again from the pointer p as defined in step S3 such as p=d+j. When j is not within the limit of (L−N+1), the last (N−1) bit patterns from the address (d+L−N+1) of the input signal bit pattern buffer d are transferred to the range of d~(d+N−2) at step S11. Then, a new input signal pattern is inputted, then the above error counting process is restarted from the address d of the input signal bit pattern buffer d.

In step S8, when Err is below THRESHOLD, the remaining bits are compared again in the remaining bit matching error counter 15. After initializing Err and loop count i to zero in step S12, errors are counted at each bit for all N bits in step S13 such as Err=Err+(p[i] eor sync [i]) until i becomes N in step S15. When N bit comparison is over, Err are compared with THRESHOLD in the second threshold discriminator in step S16 whether Err is larger than the predetermined threshold variable THRESHOLD. When Err are equal or below the THRESHOLD for all N bits, it is assumed that the synchronizing signal is detected. In step S17, the synchronizing signal detection address j on the input signal bit pattern buffer d is then transferred to the time control circuit, and then the error detection process is completed. Since the sampling time and the processing clock of DSP are constant, respectively, the time when the synchronizing signal exists is calculated by j.

Figure 2:
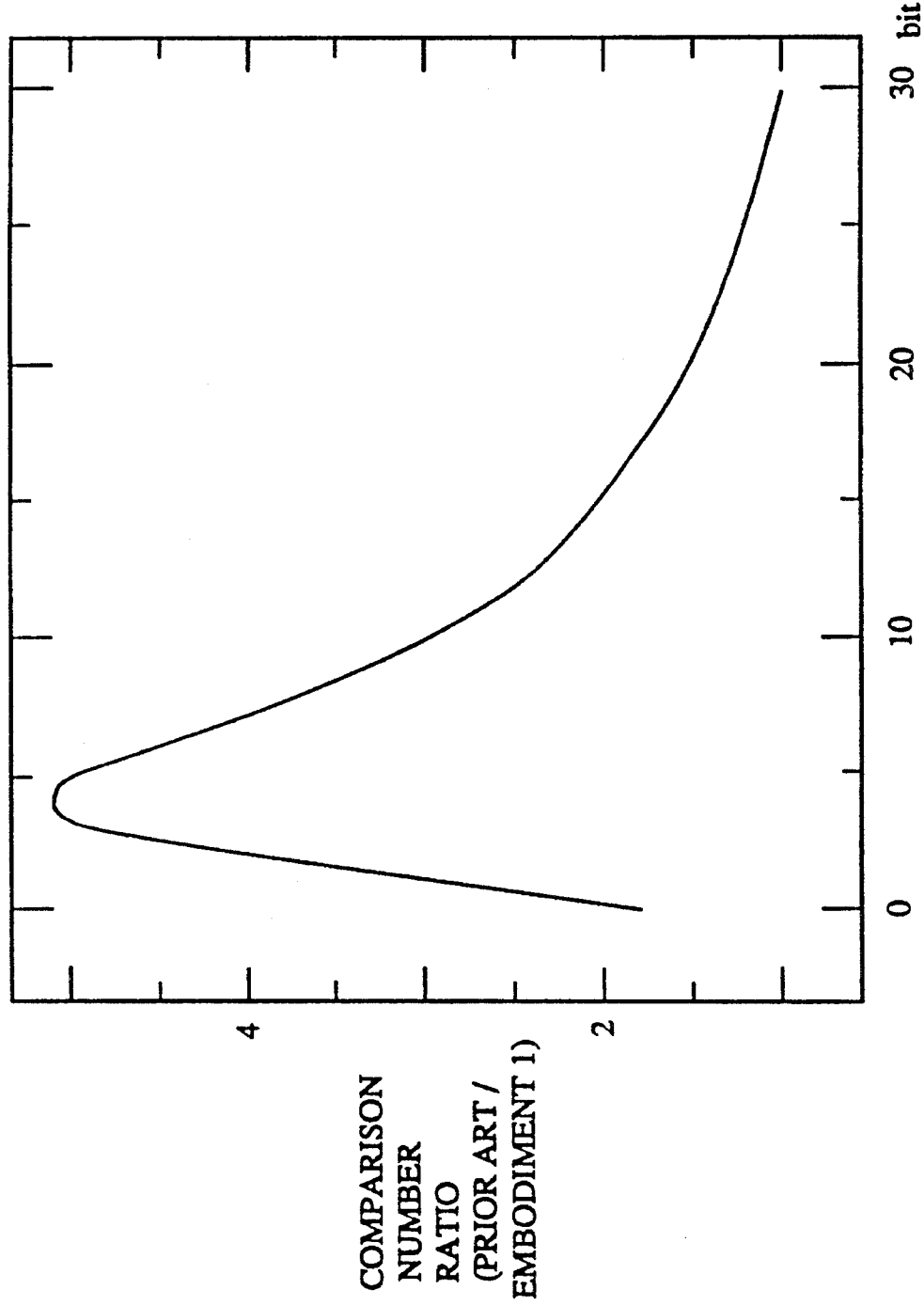
FIG. 2 shows comparison number ratio between the prior art and the first embodiment.

FIG. 2 shows comparison number ratio between the prior art and the first embodiment, in case the partial bit pattern numbers of a known reference synchronizing signal bit pattern are changed. For example, assuming here the synchronizing signal bit pattern has 30 bits and the digital demodulation bit pattern has 1000 bits in one frame. If the input signal bit pattern is compared with 4(=l) bits of the synchronizing signal bit pattern in the partial matching error counter 13 and then if the input signal bit pattern is compared with all 30 (=N) bits of the remaining bit matching error counter 15, then comparing number will be 1000/24× 30+4×1000=5860, which is approximately ⅕ times of 30000 times of the prior art as shown in FIG. 2.

EMBODIMENT 2

Figure 4:
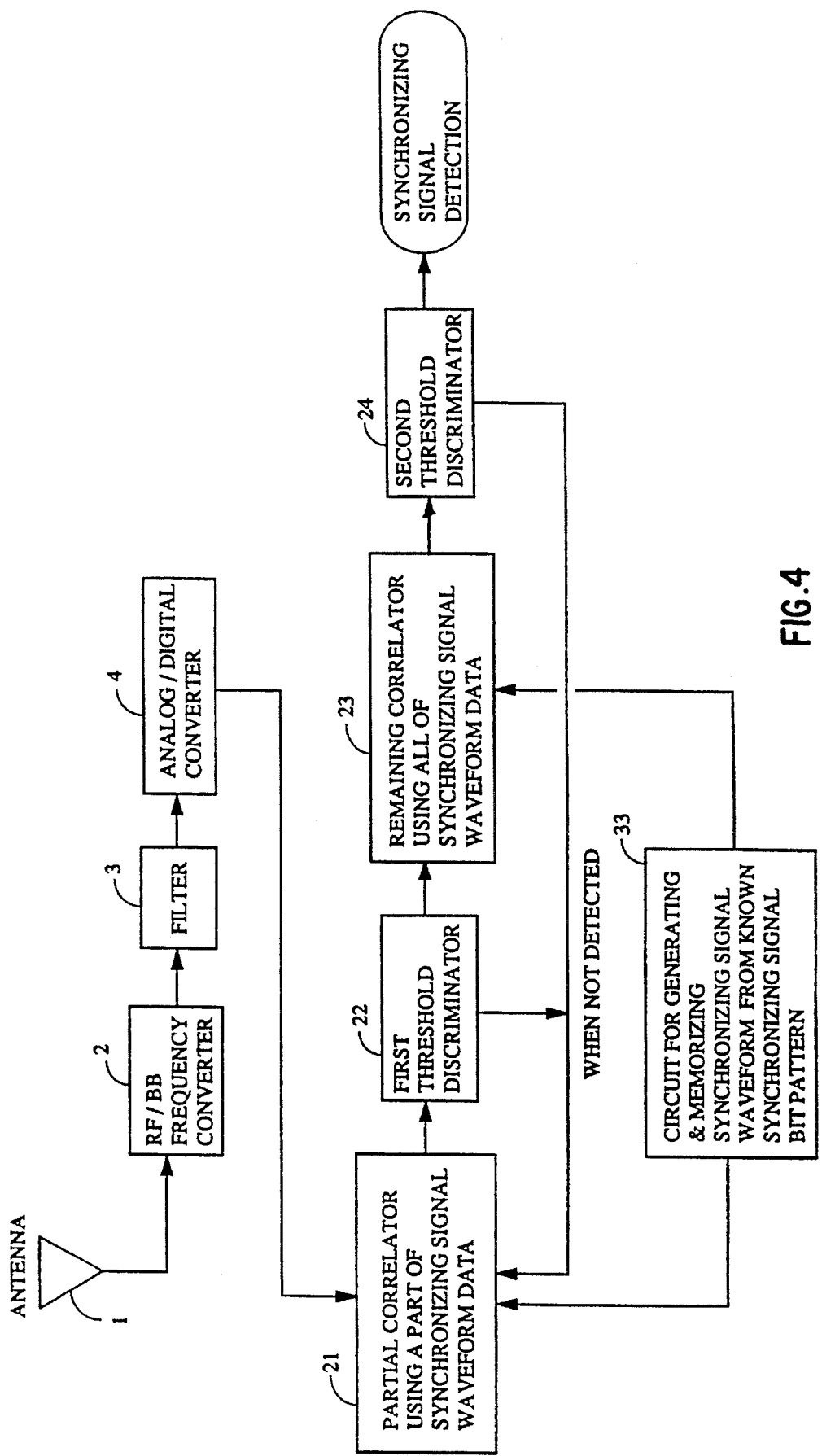
FIG. 4 is a block diagram of a synchronizing signal detection apparatus of a second embodiment of the present invention.

FIG. 4 is a block diagram of a synchronizing signal detection apparatus of a second embodiment of the present invention. In FIG. 4, the numeral 21 denotes a partial correlator, the numeral 22 denotes a first threshold discriminator, the numeral 23 denotes a remaining correlator, the numeral 24 denotes a second threshold discriminator, the numeral 33 denotes a circuit for generating and memorizing a synchronizing signal waveform data from the synchronous signal bit pattern.

Figure 5:
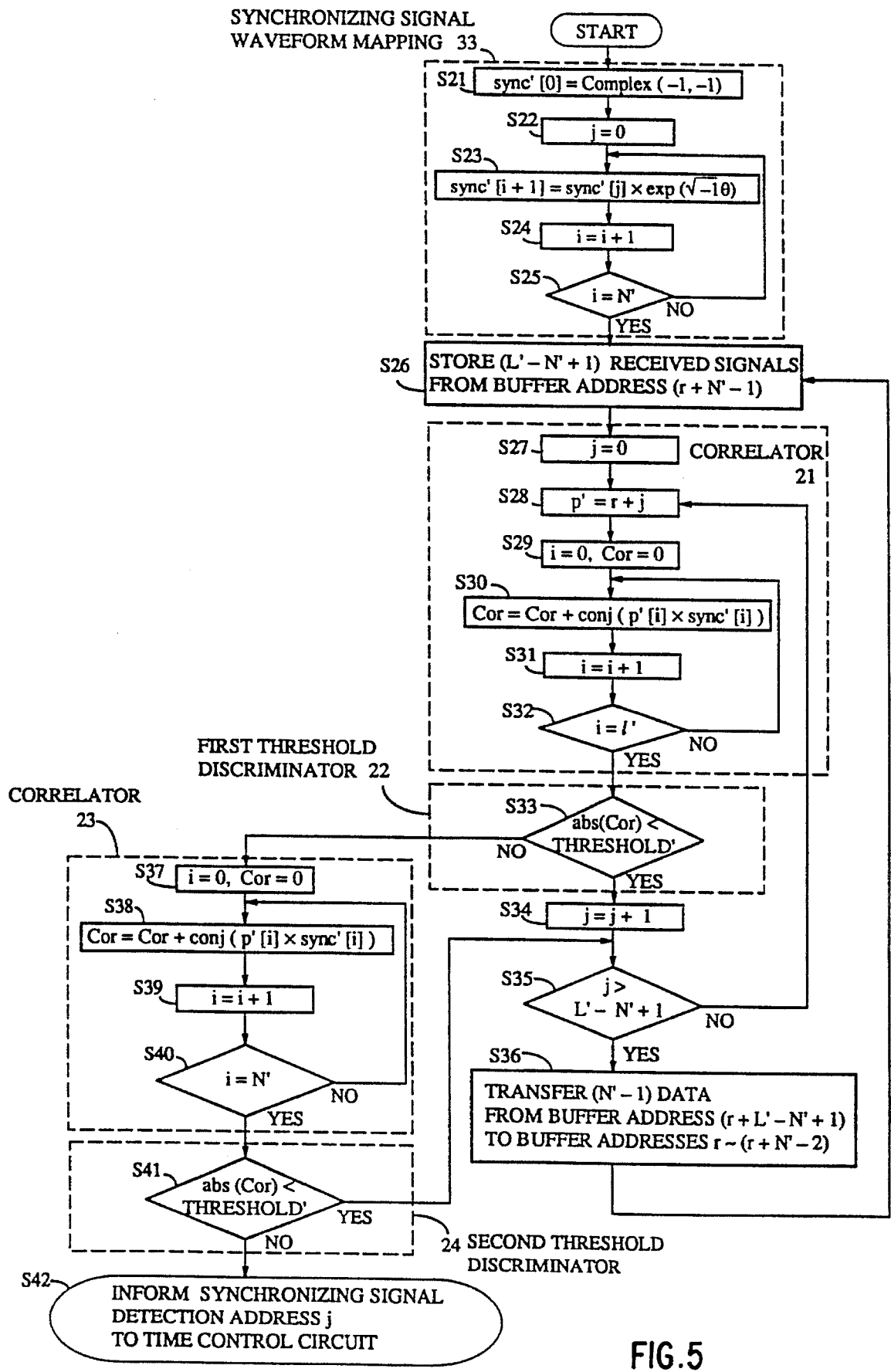
FIG. 5 is an operation flow chart of an apparatus of a second embodiment of the present invention.

FIG. 5 is a flow chart explaining an operation of the circuit 33 shown in FIG. 4. In FIG. 5, "r" is an address of the input signal waveform data buffer, "sync" is an address of the synchronizing signal bit pattern buffer, "sync'" is an address of the synchronizing signal waveform data buffer r, "θ" is π/4 shift QPSK transition angle which determines one value for two synchronizing signal bits. "p'" is a pointer which points the address of the receiving signal buffer. "l'" is a synchronizing signal waveform data length used in the partial correlator 21, "N" shows a bit pattern length of all synchronizing signal bit patterns, "N'" shows a data length of all synchronizing signal waveform data, where N'=N/2+1. "L'" shows input signal waveform data buffer length (buffer size of the input signal waveform data buffer r), "conj" shows a complex conjugate, "abs" shows an absolute value, "i", "j" show loop counters, "Cor" shows a correlation value, "THRESHOLD'" is a threshold value of correlation value, where it is seemed that the synchronizing signal is detected when "Cor" is equal or above THRESHOLD'.

An operation of the apparatus of the second embodiment is explained using FIG. 4 and FIG. 5. An input signal received from the antenna is inputted into partial correlator 21 through frequency converter 2, filter 3, analog-to-digital converter 4 as a sampling weveform data before digital demodulation is carried out.

The synchronizing signal generating & memorizing circuit 33 generates and memorizes a synchronizing signal waveform data which is a complex series defined by the known synchronizing signal bit pattern and the modulation system.

Partial correlator 21 partially correlates the input signal waveform data with a part of the synchronizing signal waveform data which is generated and memorized in the synchronizing signal generating & memorizing circuit 33. In steps S21~S25 in FIG. 5, a complex reference waveform data of the synchronizing signal waveform data is generated and memorized.

In step S26, DSP stores the necessary number of input signal waveform data into the input signal waveform data buffer r. In step S28 of FIG. 5, the partial correlator 21 points the correlation calculation starting pointer p' of the input signal waveform data to the input signal waveform data buffer r and correlates the input signal waveform data with the complex synchronizing signal waveform data. The correlator 21 functions to monitor the similarity of an input signal waveform data and a complex synchronizing signal waveform data. When the correlation of l' waveform data is taken, correlation calculation is completed when the correlator 21 passes the loop for l' times.

In step S33, the first threshold discriminator 22 judges the result of correlation calculation. When the correlation is not larger than the predetermined threshold value such as abs (Cor)<THRESHOLD', the pointer p' which points the correlation calculation starting address is incremented by one such as j=j+1, in step S34. Then, in step S35, the value j is checked whether j is larger than (L'–N'+1). In addition, the buffer length is L'(r [0]~r [L'–1]) and the correlation calculation is completed until r [L'–(N–1)–1]. Therefore, the correlation calculation is carried out after r [L'–N'+1]. In step 35, it is indicated such as j>L'–N'+1 and a sign ≧ is not used. It is because the increment step 34 of the counter is located before the comparison step 35. When j is equal or smaller than (L'–N'+1), the correlation calculation is carried out again from the address defined in step S28. If j is larger than (L'–N'+1), the last (N'–1) of waveform data in the input signal waveform data buffer r is transferred to the address of the input signal waveform data buffer r in step S36. That is, (N'–1) data from the address (r+L'–N'+1) is transferred into the address range of r~(r+N'–2) of the input signal waveform data buffer r. After a new input signal waveform data is inputted, the correlation calculation mentioned above starts again :from the address of the input signal waveform data buffer r.

On the other hand, in step 33, when the correlation is equal or larger than the predetermined threshold value such as abs (Cor)≧THRESHOLD', the remaining correlator 23 initializes the correlation value (Cor) and the loop counter i to zero, respectively, in step S37. Then, in step S38, the correlation calculation is carried out for all N' waveform data such as Cor=Cor+conj (p'[i]×sync'[i]), until i reaches N' in step S40. When the correlation calculation is completed, the second threshold discriminator 24 judges the correlation result calculated in the remaining correlator 23 whether abs (Cor) is smaller than THRESHOLD'.

When abs (Cor) is equal or larger the THRESHOLD' for all N' bits, it is assumed that the synchronizing signal is detected. In step S42, the synchronizing signal detection address j on the input signal waveform data buffer r is then transferred to the time control circuit, and then the correlation detection process is completed. Since the sampling time and the processing clock of DSP are constant, respectively, the time when the synchronizing signal exists is calculated by j.

According to the second embodiment, it is possible to detect the synchronizing signal without demodulating the digital bit pattern. That is, since it not necessary to provide the digital demodulation process, less processing are required than that in the first embodiment. With regard to the bit number for the partial correlation, partial comparison using the partial matching error counter of the first embodiment in FIG. 2 can be applied to the second embodiment in the same way.

EMBODIMENT 3

Figure 6:
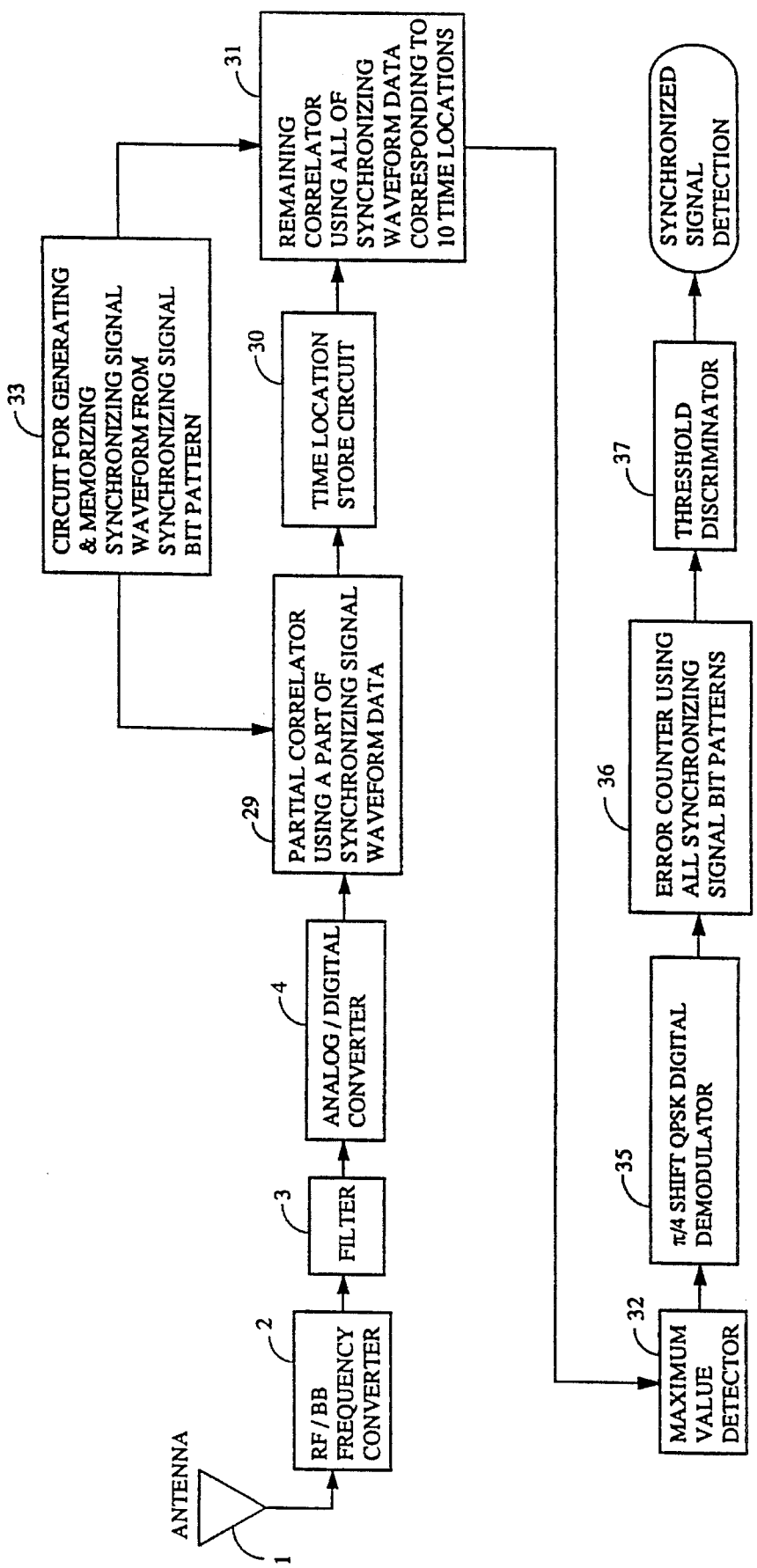
FIG. 6 is a block diagram of a synchronizing signal detection apparatus of a third embodiment of the present invention.

FIG. 6 is a block diagram of a synchronizing signal detection apparatus of a third embodiment of the present invention. In FIG. 6, the numeral number 29 denotes a partial correlator which compares a sampled input signal waveform data with a part of the reference waveform data of the complex synchronizing signal stored, the numeral number 30 denotes a time location memory circuit which stores a predetermined number of the input signal waveform data, the numeral number 31 denotes a remaining correlator, the numeral number 32 denotes a maximum value detector 32, the numeral number 35 denotes a digital demodulator which demodulates a receiving data having maximum value data for one synchronous signal length, the numeral number 36 denotes an error counter 36 which uses all synchronous signal bits, and the numeral number 37 denotes a threshold discriminator. The frequency converter 2, the filter 3, the analog-to-digital converter 4 and the mapping apparatus 33 are the same as those in the above embodiments.

Figure 7:
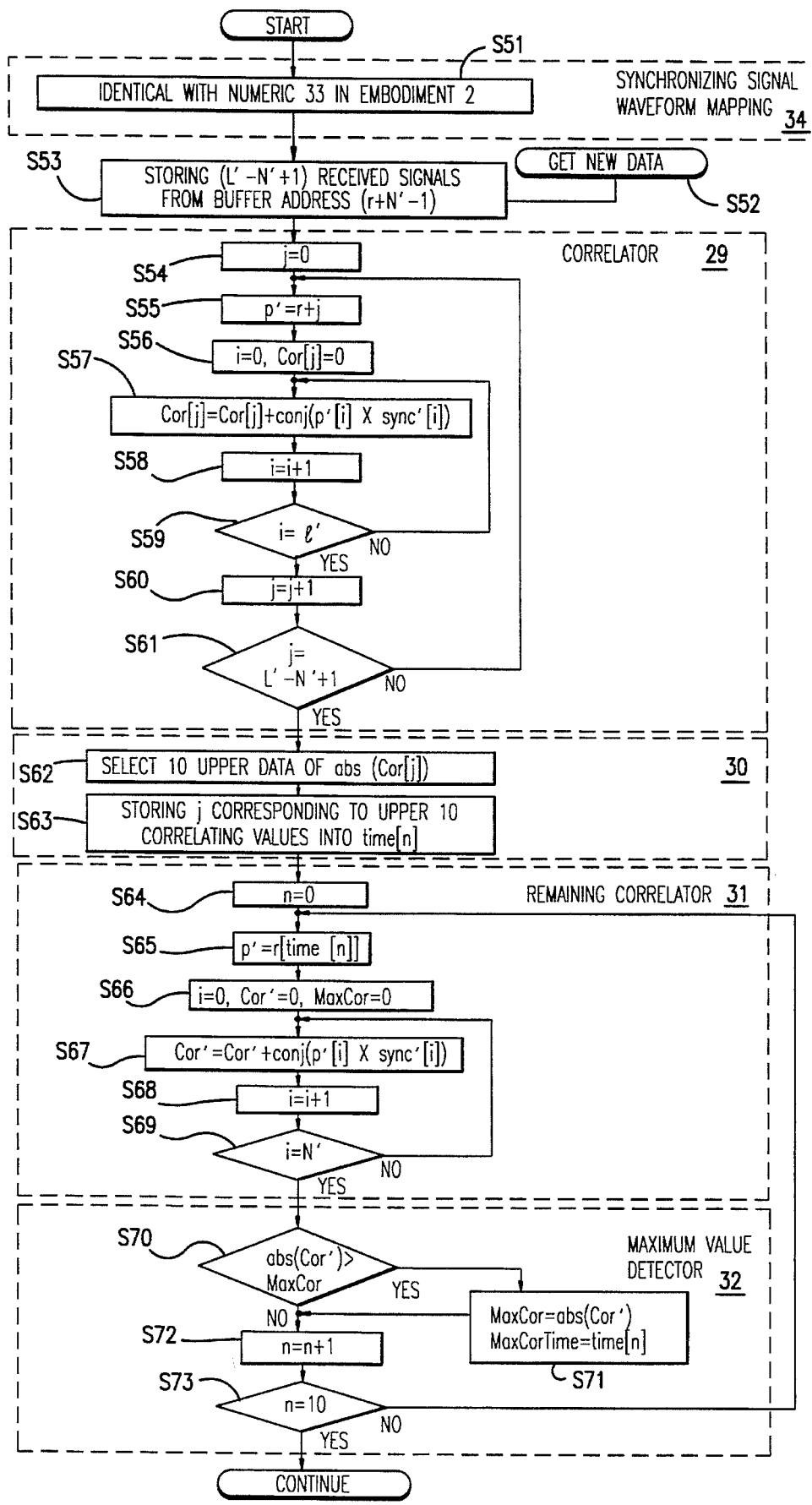
FIG. 7 is an operation flow chart of an apparatus of a third embodiment of the present invention.
Figure 8:
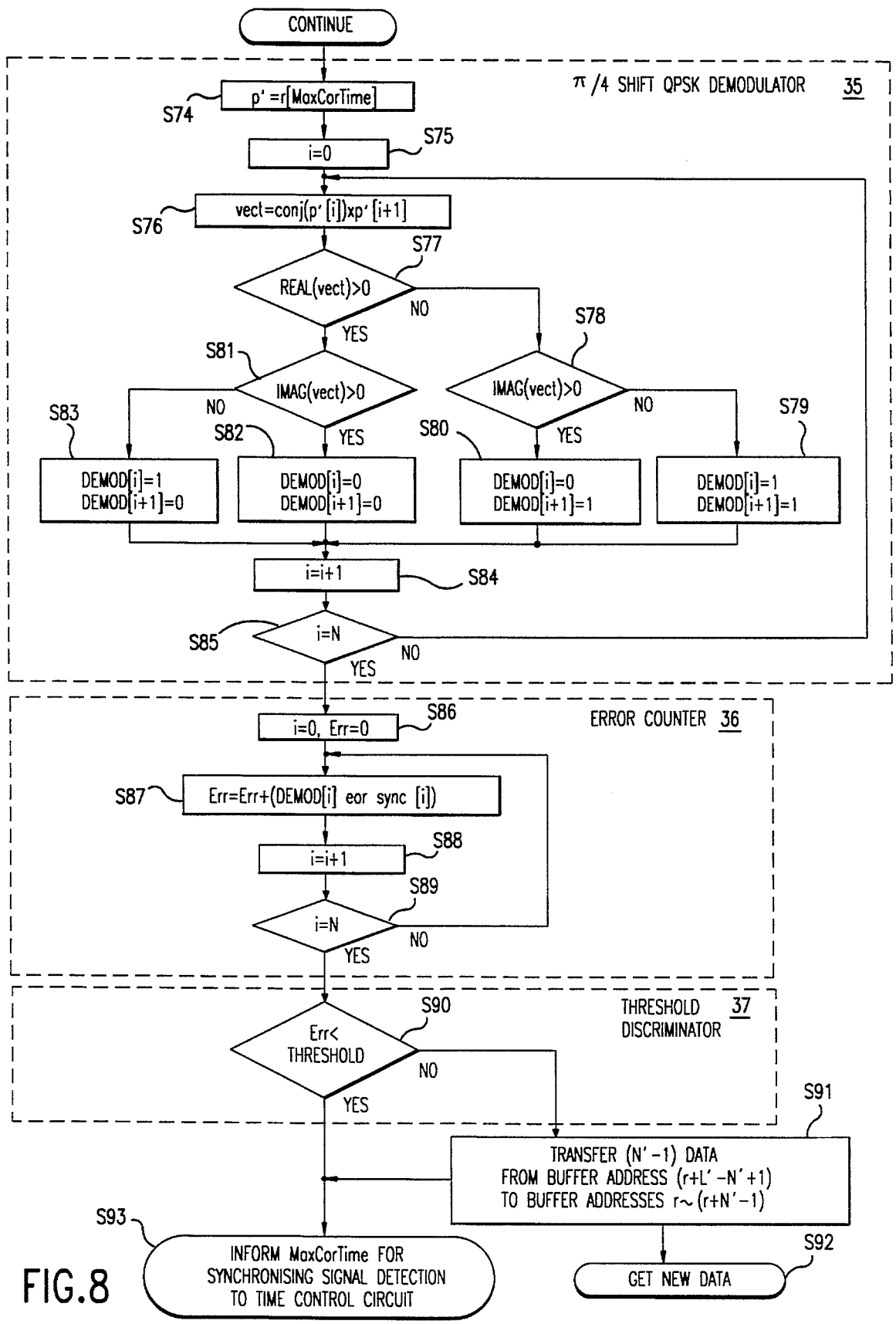
FIG. 8 is an operation flow chart of an apparatus of a third embodiment of the present invention.

FIG. 7 and FIG. 8 are operation flow charts of an apparatus of a third embodiment of the present invention shown in FIG. 6. In FIG. 7 and FIG. 8, "r" is an address of an input signal waveform data buffer, "sync" is an address of a synchronizing signal bit pattern buffer, "sync'" is an address of synchronizing waveform data buffer, "time" is a data buffer for storing upper 10 time locations of the correlation value, "Demod" is a digital demodulation bit pattern buffer and "p'" is a pointer which points the input signal waveform data buffer r.

"Err" is the number of error bits, "Cor" is a correlation value, "Cor'" is a temporary value of correlation value, "MaxCor" is a maximum correlation value, "MaxCorTime" is a time location of the maximum correlation value, "THRESHOLD" is a threshold value of error bit number, "vect" is a temporary value of delay detection, "l'" is a synchronizing signal waveform data length used in the correlator 29, "N" is a data length of all synchronizing signal bits, "N'" is a data length of all synchronizing signal waveform data buffer, "L'" is a data buffer length of input signal waveform data buffer (buffer size of the input signal waveform data buffer r), "conj" shows a complex conjugate, "abs" shows absolute value, "i", "j", n are count numbers of loop counters. "Real" shows a real part of the complex number. "Imag" shows an imaginary part of the complex number and "eor" shows exclusive OR.

An operation of the apparatus in the third embodiment is explained below using FIG. 6–FIG. 8. The synchronizing signal generating and memorizing circuit 33 generates and memorizes a synchronizing signal waveform data which is a complex series defined by the known synchronizing signal bit pattern and the modulation system in the same way as described in the second embodiment. The input signal is also supplied to the partial correlator 29 in the same way as described in the second embodiment. In step S53, DSP stores this input signal waveform data (L'–N'+1) into the addresses from (r+N'–1) of the input signal waveform data buffer r.

The operations from steps S54 to S59 are similar to those from steps S27 to S32 of the second embodiment in FIG. 5. The complex correlation the input signal waveform data r [j]–r [j+l'–1] with the synchronizing signal waveform data sync' [0]–sync [l'–1] are stored into Cor [j]. The correlation calculation is continued until the correlation calculation starting pointer p' indicates an address (r+L'–N'). As describe above in the second embodiment, the reference waveform data are complex series and the correlation in the correlator 29 is obtained by calculating discretely.

In step S62, when DSP completed the partial correlation calculation for the predetermined input data number, 10 correlation calculation starting addresses are selected among the input signal waveform data which showed the largest correlation. In step S63, the selected 10 correlation calculation starting addresses are memorized into the time location memory 30. In steps 64–69, the remaining correlator 31 carries out the correlation calculation for respective N' waveform data from 10 correlation calculation starting addresses among the input signal waveform data, using all reference complex synchronizing signal waveform data. In step S70, abs (Cor') is compared with MaxCor, and if abs (Cor')>MaxCor, the maximum value detector 32 selects a maximum correlation value abs(Cor'), and stores its abs (Cor') into MaxCor and time [n] into MaxCorTime, in step 71. Then, n is incremented by one in step S72. The digital demodulator 35 demodulates the digital bit pattern which is located at the maximum correlation location.

In the flow chart of FIG. 8, the $\pi/4$ shift QPSK demodulator 35 demodulates the digital bit patterns, for example, from step S74 to step S85. In step S86, the error counter 36 initializes the loop count i and the error count Err, then, in step S87, the error counter 36 calculates Err value for all N bits of all synchronizing signal bit patterns using the demodulated digital input signal bit pattern Demod [i] such as Err=Err+(Demo [i] eor sync [i]).

In step S90, the threshold discriminator 37 judges whether errors are less than a predetermined value THRESHOLD, i.e. whether matching are existed. If many matching are found, that is, if Err is less than THRESHOLD, the apparatus detects a synchronizing signal in step S93. The detection of the synchronizing signal, i.e. MaxCorTime, is informed to the time control circuit and the synchronizing signal detection operation is completed.

Compared with the second embodiment, no setting of the threshold value is necessary in this third embodiment, thus the circuit realization becomes easier.

Those skilled in the art will recognize that many modifications to the foregoing description can be made without departing from the spirit of the invention. The foregoing description is intended to be exemplary and in no way limiting. The scope of the invention is defined in the appended claims and equivalents thereto.

What is claimed is:

1. A synchronizing signal detection apparatus comprising:

a demodulator for digitally demodulating input signals;

a partial matching error counter for comparing every bit of the demodulated input signal bit pattern demodulated by said demodulator with a part of the known synchronizing signal bit pattern; and a remaining bit matching counter for comparing said input signal bit pattern with remaining bits of said synchronizing signal bit pattern used in said partial matching error counter, or with all synchronizing signal bit pattern, for every bit, when the number of error bits, which is obtained in said partial matching error counter, is equal or less than a first threshold value, when the number of error bits obtained in the remaining bits matching error counter is equal or less than a second threshold value, synchronizing signal is assumed to be detected.

2. The synchronizing signal detection apparatus of claim 1 wherein said partial matching error counter compares the input signal bit pattern with 10 to 25% of the synchronizing signal bit pattern.

3. A synchronizing signal detection apparatus comprising:

a means for generating and storing a corresponding complex synchronizing signal waveform data from known synchronizing signal bit pattern;

a partial correlator for correlation calculating between sampled input signal data and a part of waveform data which is an output data of said synchronizing signal waveform generation and store means; and a remaining correlator for complex correlation calculating between said input signal waveform data and the waveform data not used in the previous partial correlation calculation data which is stored in said synchronizing signal waveform generation and store means, or all synchronizing signal waveform data, when a correlation result calculated by said partial correlator exceeds a first predetermined threshold value, when the correlation result calculated in the remaining correlator is equal or larger than a second predetermined threshold value, synchronizing signal is assumed to be detected.

4. A synchronizing signal detection apparatus comprising:

a means for generating a corresponding complex synchronizing signal waveform data from known synchronizing signal bit patterns and for storing said generated corresponding complex synchronizing signal waveform data;

a partial correlator for correlation calculating between sampled input signal data and a part of waveform data which is an output data of said synchronizing signal waveform generation and store means;

a time location store means for storing a predetermined number of the time locations in the form of correlation calculation starting addresses of an input signal waveform data which corresponds to a large correlation value calculated in said partial correlator;

a remaining correlator for complex correlation calculating between said input signal waveform data which corresponds to the time location stored in said time location store means and the waveform data not used in the previous partial correlation calculation data stored in said synchronizing signal waveform generation and store means, or all synchronizing signal waveform data;

a demodulator for demodulating a predetermined bit length of an input signal waveform data which corresponds to a large correlation value calculated in said remaining calculator; and a counter means for comparing a bit pattern demodulated in said modulator with the known synchronizing signal bit pattern for every bit, when the correlation result calculated in the remaining calculator is less than a second predetermined threshold value, synchronizing signal is assumed to be detected.

5. The synchronizing signal detection apparatus of claim 3;

said partial correlator calculates complex correlation between said input signal waveform data and 10 to 25% of the waveform generated by said synchronizing signal waveform generation and store means.

6. The synchronizing signal detection apparatus of claim 4;

said partial correlator calculates complex correlation between said input signal waveform data and 10 to 25% of the waveform generated by said synchronizing signal waveform generation and store means.

* * * * *